P. A. Mayor,
Faucet.
No. 110,484. Patented Dec. 27, 1870.

Section through line x x

Witnesses: Pierre A. Mayor, Inventor

UNITED STATES PATENT OFFICE.

PIERRE A. MAYOR, OF NEW YORK, N. Y.

IMPROVEMENT IN WATER-FAUCETS.

Specification forming part of Letters Patent No. 110,484, dated December 27, 1870.

I, PIERRE A. MAYOR, of the city, county, and State of New York, have invented certain new and useful Improvements in Water-Faucets, of which the following is a specification:

Nature and Objects of the Invention.

My invention relates to that class of faucets in which the valve is opened and closed by the rotation of the screw-spindle; and it consists in certain arrangements of parts, so constructed that the perfect operation of the valve in governing the flow of water is secured at a low cost of manufacture, and the leakage to which the parts are liable is also effectually prevented. The means whereby the desired objects are secured will be fully described.

General Description.

The body of the faucet A is cast in the usual form, with the inlet and outlet tubes separated by the valve-seat $a$.

Figure 1:
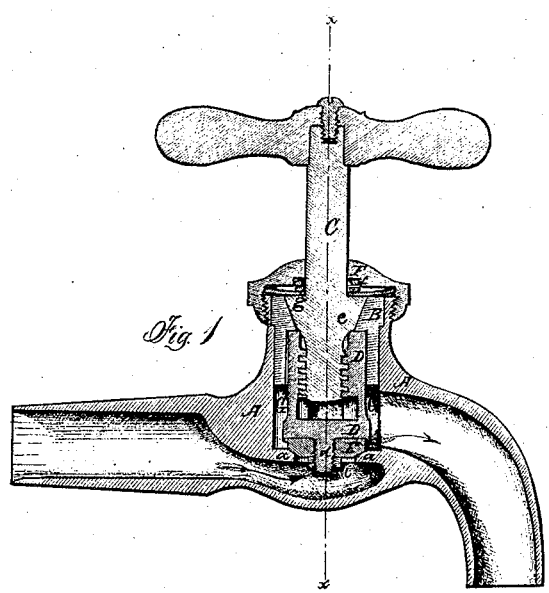
Figure 1 is a longitudinal vertical section through the center of my faucet.
Figure 4:
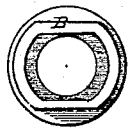
Fig. 4 is a view of the sleeve B, taken from its under side.
Figure 2:
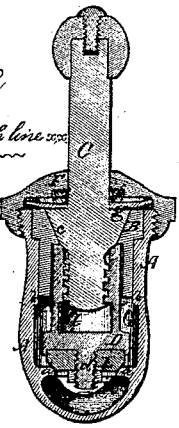
Fig. 2 is a vertical transverse section through the line $x$ $x$, Fig. 1.

The sleeve B is made in the form shown in Figs. 1, 2, and 4, and is arranged to fit snugly in the chamber G in the body of the casting. It is prevented from turning with the spindle C by means of the cheeks $b\ b$ on the sides of the chamber, between which the flat portions of the sleeve are held.

Figure 5:
Fig. 5 is a view of the plunger D in the same position.
Figure 3:
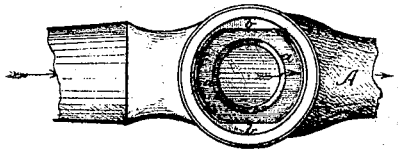
Fig. 3 is a top view, showing the arrangement of the valve-seat.

The plunger D, to which the valve E is secured, is constructed of the form shown in Figs. 1, 2, and 5, so as to fit and slide in the sleeve B; and its flat portions $e\ e$ prevent it from turning with the spindle.

The valve E is held upon the screw $d$, projecting from the bottom of the plunger D, by the nut $i$.

The spindle C, that operates the plunger D, is made with a conical collar, $c$, which fits closely and turns in a corresponding opening in the top of the sleeve, to prevent the water from rising and leaking around the spindle. The end of the spindle also is provided with a screw-thread, which fits and works in a corresponding female screw in the plunger D, so that the required raising and lowering of the plunger are produced by the rotation of the spindle.

The conical collar $c$ is kept down on its seat in the sleeve by the flexible washer $g$ and the coil-spring $f$ in the cap F, for the purpose of preventing the water from rising in the cap, and thus preserving the washer $g$ from decay, to which, in other faucets, it is liable by reason of its being exposed to the action of the water. As long as the conical collar is kept down on its seat in the sleeve B, which the washer $g$ and the spring insure, the water in the chamber is prevented from rising in the cap. The pressure upon the collar $c$ also keeps the rim of the sleeve B down upon the ledge in the chamber, from which the cheeks $b\ b$ project.

The form and arrangements of the parts described permit them to compensate for any wear in the surfaces in contact, and thus tend to keep the faucet always in working order, while the simplicity of their construction has the effect to reduce the cost of manufacture.

The inner face of the cap F is arranged so that it projects over the edge of the collar $c$ on the spindle. It may thus be used without the spring $f$, and will perform its office of keeping the collar in place just as well; but, in general, I prefer to use it as shown, for the reason that it is not necessary to fit the parts so accurately together to insure their perfect working.

Claim.

I claim—

The sleeve B, when provided with the valve-seat $c$, in combination with the plunger D and spindle C, all constructed and operated substantially as described and specified.

PIERRE A. MAYOR.

Witnesses:
C. A. DURGIN,
EDWARD E. OSBORN.